No. 729,284. PATENTED MAY 26, 1903.
C. A. DANIEL.
METALLIC PACKING FOR PISTON RODS.
APPLICATION FILED DEC. 18, 1902.
NO MODEL. 2 SHEETS—SHEET 1.
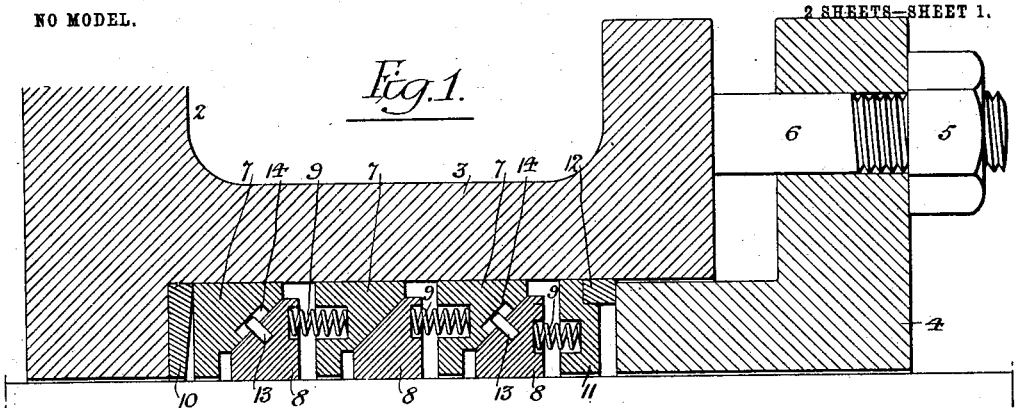
Fig. 1.
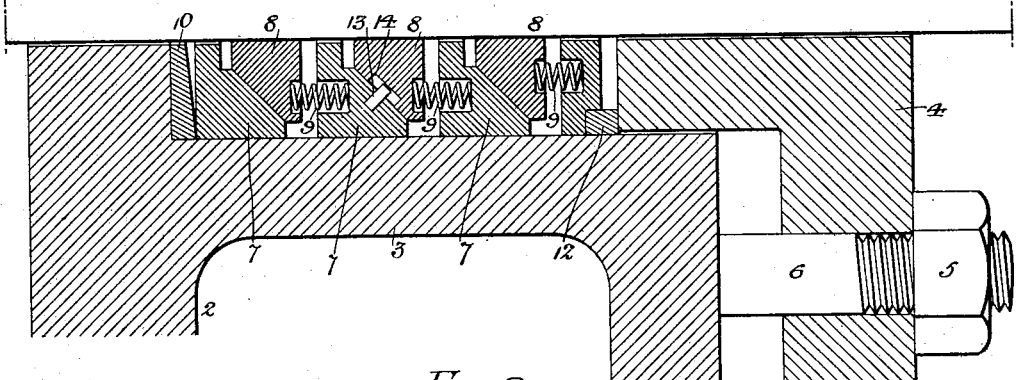
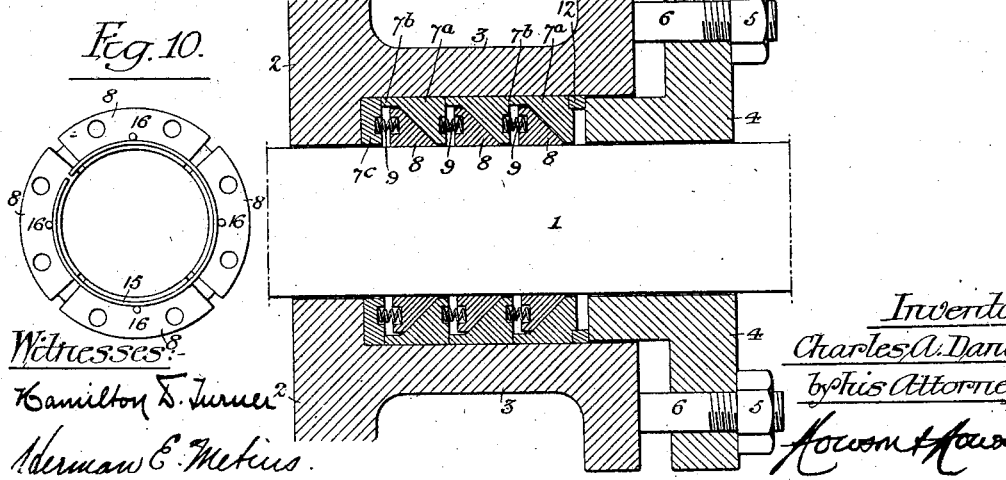
Fig. 8.
Fig. 10.
Witnesses:
Hamilton D. Turner
Herman E. Metius
Inventor:
Charles A. Daniel,
by his Attorneys

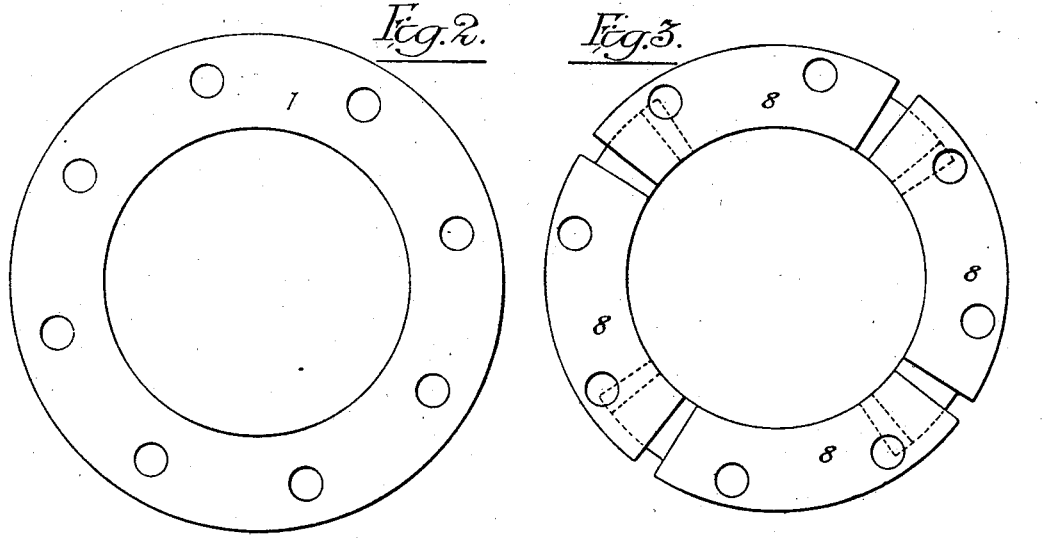
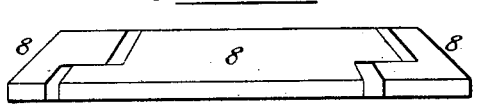
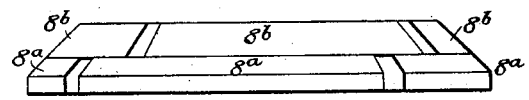
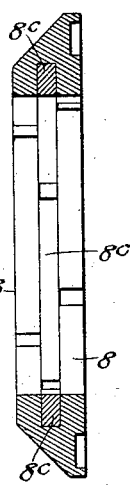
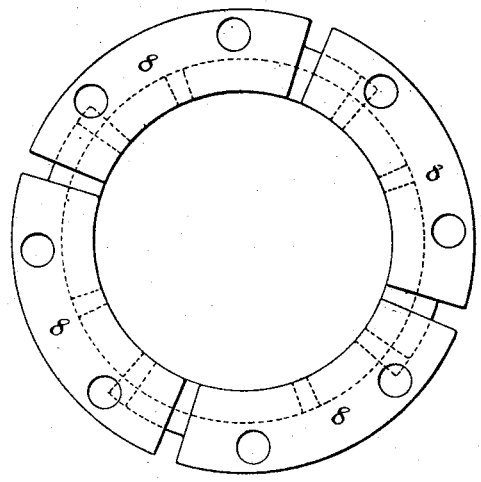

No. 729,284.

Patented May 26, 1903.

UNITED STATES PATENT OFFICE.

CHARLES A. DANIEL, OF PHILADELPHIA, PENNSYLVANIA.

METALLIC PACKING FOR PISTON-RODS.

SPECIFICATION forming part of Letters Patent No. 729,284, dated May 26, 1903.

Application filed December 18, 1902. Serial No. 135,749. (No model.)

*To all whom it may concern:*

Be it known that I, CHARLES A. DANIEL, a citizen of the United States, residing in Philadelphia, Pennsylvania, have invented certain Improvements in Metallic Packing for Piston-Rods, &c., of which the following is a specification.

My invention relates to metallic packing for piston-rods, valve-rods, pump-plungers, and the like, the object of my invention being to provide a packing which will when there is pressure in the chamber from which the rod projects bear upon said rod with a force proportionate to such pressure, but when there is no pressure within the chamber will bear lightly upon said rod, thereby lessening the wear both upon the packing-rings and upon the rod and reducing the waste of power due to useless friction, the pressure of the packing upon the rod being proportionate to the duty which it has to perform in preventing escape of fluid under pressure around the rod.

In the accompanying drawings, Figure 1 is a longitudinal sectional view of part of a piston-rod and part of a cylinder-head with stuffing-box provided with packing in accordance with my invention. Fig. 2 is a rear view of a compressor-ring constituting part of said packing. Fig. 3 is a front view of a contractile ring constituting part of the packing. Fig. 4 is an edge view of the ring shown in Fig. 3. Fig. 5 is a similar view illustrating another construction of said ring. Fig. 6 is a sectional view illustrating still another construction of said ring. Fig. 7 is a side view of the ring shown in Fig. 6. Fig. 8 is a view of a stuffing-box, illustrating a modified form of my improved packing. Fig. 9 is a side view of a modified form of spring for use with said packing; and Fig. 10 is a view, on a reduced scale, of a contractile ring, illustrating a special feature of the invention.

In Fig. 1 of the drawings, 1 represents part of the piston-rod or valve-rod of an engine, and 2 part of the cylinder-head or valve-chest, having a projecting stuffing-box 3, with follower 4, which can be adjusted by means of nuts 5 upon bolts 6, projecting from the flange of the stuffing-box and passing through openings in the flange of the follower in the ordinary manner.

The packing consists of a series of compressor-rings 7 and a corresponding series of contractile rings 8, the compressor-rings fitting snugly within the bore of the stuffing-box and being free from contact with the rod, upon which, however, the contractile rings 8 bear at all times. The rings 7 and 8 have beveled faces in contact with each other, such contact being maintained at all times by means of springs 9, interposed between the adjoining flat faces of the rings 7 and 8 and adapted to sockets in each of said rings, so as to prevent displacement. Each of the rings 7 is by preference a single ring, as shown in Fig. 2, although it may, if desired, be composed of segments with overlapping joints to prevent leakage; but each of the contractile rings 8 is of necessity composed of segments or otherwise constructed—as, for instance, by being split at one point—so that it is free to expand and contract in order to press upon the rod with different degrees of pressure, the segments having overlapping ends, as shown in Figs. 3 and 4, so as to prevent leakage at the joints.

At the base of the stuffing-box is a ring 10, preferably beveled on its front face, so as to permit access of the fluid from the cylinder or valve-chest to the rear face of the innermost ring 7, and at the outer end of the stuffing-box is a ring 11, recessed around its outer edge for the reception of a soft-metal ring 12, which is acted upon by the follower 4 and is expanded against the bore of the stuffing-box in order to prevent any leakage around the outside of the follower.

When there is pressure of fluid in the forward end of the cylinder or valve-chest, such pressure is exerted upon the rearmost ring 7, and the entire series of rings 7 and 8 is pressed forwardly in the stuffing-box with a force dependent upon such pressure, the compressor-rings 7 acting with a wedge-like action upon the contractile rings 8, so as to compress the same upon the rod with a pressure commensurate with the pressure in the cylinder or valve-chest, thus preventing any leakage between the rod and the rings 8. When the pressure in the forward end of the cylinder or valve-chest is relieved, however, the packing-rings in the stuffing-box are likewise relieved from pressure. Hence the bearing of the rings 8 upon the rod is only such as would be caused by the pressure of the springs 9. This pressure cannot be excessive, as the pull of the advancing rod upon the rings 8 tends to separate their beveled faces from the beveled faces of the rings 7. Hence during the forward stroke of the rod there is but little pressure of the rings 8 upon the same, although the rings should during this stroke bear upon the rod with sufficient force to prevent leakage of air into the cylinder or valve-chest when a partial vacuum is maintained therein during such forward stroke.

If the pressure of fluid is exerted in the forward end of the cylinder during the forward stroke of the piston, the arrangement of the rings should, by preference, be reversed.

In order to facilitate the lapping of the ends of the segments constituting each ring 8, it may be advisable in some cases to form said ring in two parts separated on the line of the overlap—as shown, for instance, at 8ª 8ᵇ in Fig. 5—and in other cases the ring 8 may be grooved for the reception of an internal ring 8ᶜ, likewise composed of segments which break joint with those of the ring 8, as shown in Figs. 6 and 7.

While preferable, it is not essential to the proper carrying out of my invention that the compressor-rings 7, as well as the contractile rings 8, should be longitudinally movable in the stuffing-box. For instance, in Fig. 8 I have illustrated a construction in which the compressor-rings 7ª have projecting flanges 7ᵇ, so that they are held firmly in contact with each other or with a base-ring 7ᶜ by the pressure of the follower. In this case the pressure of motive fluid upon the innermost contractile ring 8 pushes the same forwardly, and consequently compresses it upon the rod, and if this ring is insufficient to prevent leakage beyond the same the pressure will act upon the second ring 8 of the series and also in turn upon the third ring, if necessary.

Although I have shown in the drawings a stuffing-box provided with three pairs of rings in accordance with my invention, it will be evident that the number of pairs of rings employed may be varied in accordance with the circumstances under which the packing is to be used, more than three pairs being necessary in some cases and less in others.

The angle of bevel of the rings may be varied in accordance with the particular conditions under which the packing is to be used, and a single corrugated plate-spring—such, for instance, as shown in Fig. 9—may be substituted for the series of coiled springs as a means of normally retaining the compressor-rings and contractile rings in contact with each other.

The ordinary dowel-pin construction may be adopted to confine the segment of each ring 8 to its corresponding ring 7 and prevent such movement of said segments as will open their joints. The dowel-pins may project into the spaces between the segments, or pins 13 on the segments may project into elongated recesses 14 in the rings 7, or vice versa, as shown in Fig. 1.

It may be advisable in some cases to combine with the segments of the contractile ring a spring or springs for the purpose of separating said segments and expanding the ring when the same is released from pressure tending to force it against the compressor-ring. In Fig. 10 such a spring is shown at 15, the spring being in the form of a split ring engaging with lugs 16 on each of the segments of the contractile ring, said spring having a normal tendency to expand the segments, but being susceptible of contraction when said segments are contracted.

A construction of this character while generally applicable is of especial advantage in a packing such as shown in Fig. 8, where the friction of the rod upon the contractile rings when the latter are relieved from pressure of the fluid tends to force said contractile rings against the compressor-rings.

Having thus described my invention, I claim and desire to secure by Letters Patent—

1. Metallic rod-packing comprising a series of pairs of rings, each consisting of a compressor-ring and a contractile ring bearing upon the rod and having beveled bearing upon the compressor-ring, the pairs of rings and the rings of each pair being susceptible of a limited amount of longitudinal movement independently of each other in the stuffing-box, substantially as specified.

2. Metallic rod-packing in which are combined a compressor-ring, a contractile ring fitting snugly to and supported by the stuffing-box bearing upon the rod and having beveled bearing upon the compressor-ring, and one or more springs for normally retaining the rings in contact with each other, substantially as specified.

3. Metallic rod-packing comprising a series of pairs of rings, each consisting of a compressor-ring, and a contractile ring bearing upon the rod and having beveled bearing upon the compressor-ring, the pairs of rings and the rings of each pair having a limited amount of longitudinal movement independently of each other in the stuffing-box, and springs maintaining the compressor and contractile rings normally in contact with each other but permitting such longitudinal movement, substantially as specified.

4. Metallic rod-packing comprising one or more pairs of rings, each consisting of a compressor-ring and a contractile ring bearing upon the rod and having beveled bearing upon the compressor-ring, said rings being so disposed that the movement of the rod, when there is no pressure to retain, tends to separate the beveled faces of the rings, substantially as specified.

5. Metallic rod-packing comprising one or more pairs of rings, each consisting of a compressor-ring and a contractile ring bearing upon the rod and having beveled bearing upon the compressor-ring, said rings being so disposed that the movement of the rod, when there is no pressure to retain, tends to separate the beveled faces of the rings, and one or more springs acting upon the rings in opposition to such separating tendency of the rod, substantially as specified.

6. Metallic rod-packing in which are combined a compressor-ring, a contractile ring bearing upon the rod and having beveled bearing upon said compressor-ring, whereby longitudinal movement of one in respect to the other causes tightening of the contractile ring upon the rod, and a spring or springs tending to spread said contractile ring, substantially as specified.

In testimony whereof I have signed my name to this specification in the presence of two subscribing witnesses.

CHARLES A. DANIEL.

Witnesses:
F. E. BECHTOLD,
JOS. H. KLEIN.